United States Patent
Morlec et al.

[11] Patent Number: 5,965,097
[45] Date of Patent: Oct. 12, 1999

[54] ROTARY DEVICE FOR CATALYTIC CLEANING OF GASEOUS EFFLUENTS

[75] Inventors: Jean Morlec, Saint-Nazaire, France; Jacques Bourcier, 4, rue I'Etoile du Matin, 44600 Saint-Nazaire, France

[73] Assignees: Institut Francais Du Petrole, Cedex, France; Jacques Bourcier, Saint-Nazaire, France

[21] Appl. No.: 08/986,141

[22] Filed: Dec. 5, 1997

[30] Foreign Application Priority Data

Dec. 5, 1996 [FR] France .................................. 96 15072

[51] Int. Cl.⁶ ................................. B01J 8/00; F01N 3/10
[52] U.S. Cl. ........................ 423/210; 423/245.3; 422/171; 422/173; 422/174; 422/175; 422/177; 422/181; 422/209; 422/199; 165/5; 165/6; 165/8; 165/9; 165/10; 110/235; 110/236
[58] Field of Search ................................. 423/210, 245.3; 422/171, 173, 175, 177, 181, 174, 182, 183, 209, 199, 207, 194; 165/5, 6, 8, 9, 10; 110/235, 236; 431/5, 7

[56] References Cited

U.S. PATENT DOCUMENTS 4,741,690  5/1988  Head ........................................... 431/7
5,186,901  2/1993  Bayer et al. ............................. 422/111
5,643,538  7/1997  Morlec et al. ........................... 422/173
5,820,836  10/1998 Morlec et al. ........................... 422/173

FOREIGN PATENT DOCUMENTS

| 37119 | 10/1981 | European Pat. Off. . |
| 194430 | 9/1986 | European Pat. Off. . |
| 2246724 | 5/1975 | France . |
| 9616729 | 6/1996 | WIPO . |
| 9620039 | 7/1996 | WIPO . |

*Primary Examiner*—Hien Tran
*Attorney, Agent, or Firm*—Antonelli, Terry, Stout & Kraus, LLP

[57] ABSTRACT

The invention relates to a cleaning device wherein polluted effluents are passed into a cage (2) where a partitioned ring (1) of vertical axis, containing a charge (M) of a solid material exhibiting a large heat exchange surface and, against the inner wall thereof, a catalyst bed (9), rotates. An autothermal working point is reached by including in the catalyst bed heating means (resistors for example) that are temporarily connected to the power supply system, after which the cleaning operations with rotation of the ring and effluent circulation are launched. Heat control is thereafter provided by controlled injection into the effluents of either a fuel or sprayed water for example by means of injectors (15, 16). The device can be applied in the field of incineration of VOC for example in industrial effluents.

14 Claims, 1 Drawing Sheet

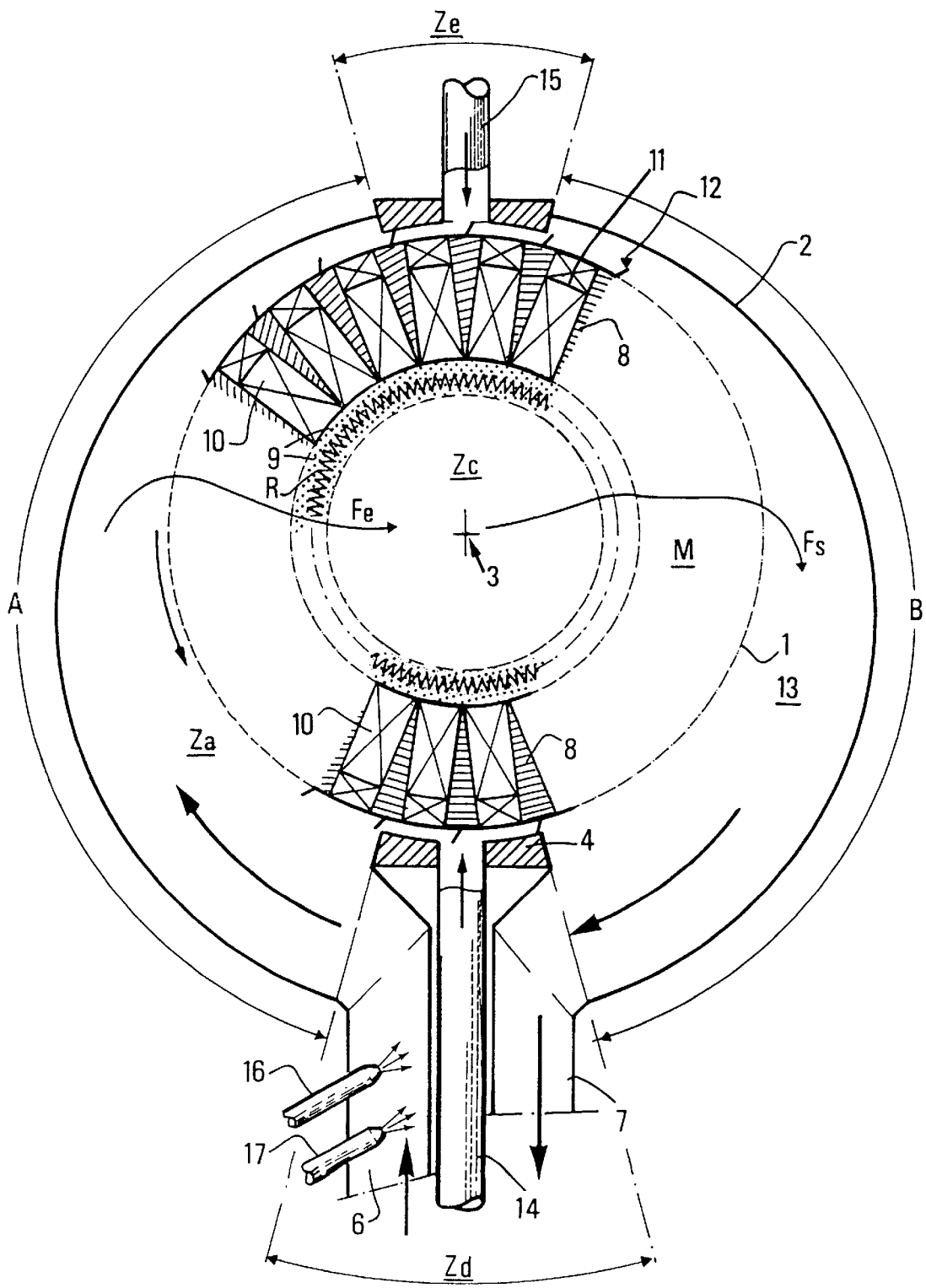

ROTARY DEVICE FOR CATALYTIC CLEANING OF GASEOUS EFFLUENTS

FIELD OF THE INVENTION

The invention relates to an improved rotary device intended for catalytic cleaning of gaseous effluents.

The invention finds applications notably in heat exchange systems or in systems suited for cleaning air loaded with substances such as volatile organic compounds (V.O.C.), which can be oxidized and eliminated by thermal or catalytic incineration.

BACKGROUND OF THE INVENTION

Patent FR-A-2,720,488 describes a device intended for heat exchange and cleaning of polluted gases such as VOC by thermal and/or catalytic effect. It comprises a housing or cage, a pipe for feeding polluted effluents into the cage, another pipe for discharging the processed effluents from the cage, a ring containing an inert charge of solid particulate materials exhibiting a large heat exchange surface (silica, granite or lighter materials such as metal honeycomb structures or others, or cryogenic nodules for negative temperatures, etc.) which is arranged within the cage. The ring can be divided into several parts by means of an inner partitioning or, in some cases, serve as a support for a certain number of baskets. Motive means are used to drive the ring and the cage into a rotating motion with respect to each other around a vertical axis (either the ring rotates, the cage being stationary, or the ring is stationary and the cage rotates around it). A first heat transfer occurs between the effluents and the inert charge in a first angular sector of the ring. A second heat transfer occurs between effluents and the charge in the ring in a second sector of the ring. A thermal reactor possibly provided with a catalyst bed is arranged in this central part in order to burn the polluting substances in the effluents channelled by the first angular area.

Patent FR-A-2,728,483 describes a device intended for catalytic cleaning of effluents polluted by VOC comprising, within a stationary cage, a rotating ring of vertical axis comprising an annular catalyst bed covering the inner wall thereof and an annular charge, outside the catalyst bed, of a material exhibiting a large heat exchange surface. The effluents flow twice through the catalyst bed on either side of the central zone. A burner is placed above the central reaction zone and it is connected to a fuel injection pipe by means of a rotary joint. It is used to heat the incoming effluents so as to reach an autothermal working point, or possibly to provide makeup heat in cases where the polluting VOC compound content is insufficient to reach it.

SUMMARY OF THE INVENTION

The device intended for catalytic cleaning of gaseous effluents according to the invention comprises a housing or cage, a ring of vertical axis arranged within the cage containing a thermal charge of materials exhibiting a large heat exchange surface, and motive means for driving the ring in a rotating motion with respect to the cage, a catalyst-bed reactor placed in the central part of the device for cleaning the effluents, at least one pipe for feeding effluents into the cage and at least one pipe for discharging effluents from the cage, the ring comprising at least a first sector allowing continuous communication between the feed pipe and the central part of the cage, and at least a second ring sector allowing continuous communication between the central part of the cage and the discharge circuits.

The device is mainly characterized in that it comprises heating elements embedded in the catalyst bed (which is preferably arranged in the ring against an inner wall thereof) and connecting means intended to connect temporarily these heating elements to a power supply unit external to the device long enough to bring the catalyst bed to a temperature sufficient to trigger a reaction of catalytic oxidation of the polluting substances, and means for injecting fluids into the effluents fed in the device, in order to control the temperature prevailing in the central area during effluent cleaning operations.

The catalyst bed heating means comprise resistors for example.

The fluid injection means can comprise, for example, an injection circuit associated with the feed pipe in order to inject a fuel into the effluents to be cleaned and/or an injection circuit, also associated with the feed pipe, in order to inject a non-inflammable liquid such as sprayed water, for example, into the effluents to be cleaned so as to cool the reactor.

According to an embodiment, the device can also comprise particle filtering means associated with the ring, consisting for example of a filter layer externally added to said ring so as to retain the particles likely to clog the thermal mass and/or the catalyst bed. It may be a removable bed of metallic, ceramic, composite materials, more generally of woven or non-woven materials whose density is suited to the stopping power sought.

The device affords many advantages. Using heating elements in intimate contact with the catalyst, which are temporarily connected to an external power supply unit prior to starting the cleaning operations proper, greatly simplifies the making and the use of the device.

Preheating of the catalyst is comparatively much faster than with the indirect warm air circulation heating means previously used where the reactor is brought to a high operating temperature through circulation of air heated by means of a secondary burner. Not only because heating is more effective as a result of the close contact between the heating elements and the catalyst, but also because the preheating sequence is much shorter. In fact, the regulations in force require to observe codified safety sequences for the feeding and the lighting of industrial burners which lengthen implementing operations.

The preliminary heating stage can be carried out outside the normal operating periods of the device, at night or at week-ends, and at a lower price by taking advantage of off-peak tariffs. Connection with the power system is simplified since it is established only when the ring is immobilized. Since the means intended for operating temperature control are fluid injection circuits (fuel and sprayed water for example) associated with the effluent feed pipe, they are readily installed. The layout of the device favours a manufacturing and upkeep cost decrease and simplifies the safety means to be implemented.

The process according to the invention implemented by means of the device allows cleaning of gaseous effluents loaded with polluting substances by catalytic incineration, by means of the aforementioned device for example. It is characterized in that it comprises successively a preliminary stage of heating the catalyst bed reactor through temporary connection, to a power supply unit external to the device, of heating elements embedded in the catalyst bed and, after disconnection of the heating means, an operating stage comprising establishing a permanent circulation of effluents to be cleaned through the ring, rotation of the ring with respect to the cage and thermal control of the autothermal reaction by controlled injection of a fuel and/or of at least one non-inflammable coolant in the device.

BRIEF DESCRIPTION OF THE DRAWING

Other features and advantages of the improved device according to the invention will be clear from reading the description hereafter of non limitative embodiment examples, with reference to FIG. 1 which diagrammatically shows a cross-sectional view of an embodiment of the device.

DETAILED DESCRIPTION OF THE INVENTION

Device comprises (FIG. 1) a ring 1 of vertical axis arranged within an external metal housing or cage 2 of cylindrical shape for example. The diameter of cage or housing 2 is larger than that of ring 1. The latter is for example off-centre with respect to cage 2. On either side of the diametral plane containing the vertical axis 3 of the ring, and in a limited circular sector, cage 2 comprises a lateral wall portion 4 substantially tangential to the lateral wall of the ring. The inner space of the cage around ring 1 on either side of wall portion 4 thus comprises two round zones of variable section Za and Zb. They communicate respectively with a feed pipe 6 intended for delivery of the gaseous effluents to be cleaned and a discharge pipe 7 intended for discharge of these effluents after cleaning.

Ring 1 is provided with an inner partitioning consisting of evenly distributed radial plates or angular sectors 8. A first angular sector A delimited by one or more radial plates 8 channels the effluents to be cleaned and fed into the convergent zone Za towards the central zone Zc of the ring (flow Fe). A second angular sector B communicates the central zone Zc of the ring with the divergent zone Zb and with discharge pipe 7 (flow Fs).

The inner wall of the ring is thoroughly covered with an annular catalyst bed consisting of a particle bed or possibly of a honeycomb structure catalyst. The effluents must flow through the catalyst bed a first time to reach the reactive central zone and a second time to leave it and flow through the opposite angular zone prior to being discharged outside.

Heating means are used to heat catalyst bed 9. Resistors R (FIG. 2) are for example used and arranged within the catalyst bed, around the inner circumference of ring 1, connected to electric connection means (not shown) that can be connected to the power system either manually or by means of a connecting robot of a well-known type.

An inert mass M consisting of a material with a large heat exchange surface to is distributed in the remaining part of ring 1, outside this catalyst bed 9 and between partitioning plates 8. It may be ceramic or metal balls, turning chips or machining chips, random or stacked packing, an alveolate structure with regular or irregular alveoli such as a honeycomb structure, knitted, woven or needled metal or ceramic mats, etc. A honeycomb structure such as that described in patent FR-2,564,037 registered by the applicant can for example be used, or a stone structure.

In order to facilitate construction and loading, the ring can also be designed to serve as a support for a certain number of parallelepipedic baskets 10 spaced out as shown in FIG. 1.

According to a preferred embodiment, particle filtering means can be added outside the ring, so as to stop the dust and particles likely to eventually clog thermal mass M and catalyst bed 9. These filtering means can consist of a filter layer 11 for example in the form of a readily removable 3 to 10-cm thick preformed mat of metal, ceramic or composite materials, or more generally of a woven or non-woven material whose density is suited to the stopping power sought. This filter layer takes part in the heat exchange as a result of the large surface area thereof.

In the diametral plane of symmetry containing the vertical axis 3 of the ring, the narrowness of the space remaining between the ring and the cage, as a result of the off-center position thereof and of the bulging wall portion 4, generates a sufficient pressure drop to prevent direct peripheral communications between the two upstream and downstream spaces or zones Za and Zb other than through central zone Zc. Joints or flaps 12 can possibly be placed on the periphery of the ring where the temperature is relatively low in order to perfect the seal.

The ring and the cage are closed in the lower and tipper parts thereof by plane plates 13. Several blade joints (not shown) simultaneously resting between the corresponding plates of the ring and of the cage prevent parasitic bypass flows between zones Za and Zb.

Motive means (not shown) situated above the cage for example are coupled with the pin 3 of the ring so as to drive it into rotation with respect to the cage.

The intermediate angular sector Zd delimited by the wall portion 4 of the cage preferably comprises an opening for a fresh air injection pipe 14 intended to drain the foul effluents through the thermal mass and the catalyst in the few angular sectors of the ring going past it prior to each inversion of the direction of flow. After flowing through the drained sectors, the purge air reaches the central zone where it is carried along with the main flow towards zone Zb through ring 1.

In sector Ze opposite sector Zd, the cage comprises another pipe 15 for a fresh air injection intended to control, if need be, the temperature of the catalytic reaction if it rises too much.

The device also comprises a means 16 for injecting a fuel such as LPG (liquid propane gas) for example, and a means 17 for injecting a coolant such as sprayed water for example to complete the action of the air injected through pipe 15.

Operation

A first stage consists in bringing catalyst bed 9 to a sufficient temperature (200 to 300° C. for example) so that the oxidation reaction can be triggered in the presence of VOC. The connection means connected to the resistors R intended to heat the catalyst bed are linked up with an external source of energy such as the power system. The operation is preferably performed outside the normal operating periods of the device by taking advantage of reduced-rate periods (at night for example).

Once the reaction temperature (300° C. for example) has been reached, the device is started, ring 1 is driven into rotation and an effluent circulation is established within cage 2. The effluents flow twice through catalyst bed 9, a first time to reach the central zone of ring 1 as they flow in from delivery zone Za, a second time to reach discharge zone Zb. The oxidation reaction is set off spontaneously in the presence of the VOC particles in the effluents. It is exothermic and adjusted so as to release enough energy to substantially compensate for the heat dissipation. According to the thermal efficiency of the thermal charge or inert mass M and to the operating temperature, a proportion of 0.3 to 1 g of VOC per $m^3$ of effluents is generally sufficient for an autothermal operation.

Fresh air can be injected through pipe 15 so as to control at first the temperature of the catalytic reaction if it rises too much. If this injection is insufficient to provide the required heat control, a sprayed liquid such as water is injected through pipe 17 and mixed with the effluents to be processed.

Means 16, 17 intended for injection of fuel and of coolant through feed pipe 6 allow to compensate for the temperature variations linked with the variations in the polluting compounds (VOC) content of the effluents. If the content decreases, a fuel injection is performed so as to raise the temperature prevailing in the central part of cage 2. If the temperature in the reactive zone rises under the effect of a VOC content increase, a coolant (sprayed water for example) injection is performed so as to bring it back to a normal operating temperature range.

After double passage through the catalyst bed, on either side of central zone Zc, the VOC are converted by the reaction into various combustion products $CO_2$, $H_2O$, $N_2$ mainly, $SO_x$ and $NO_x$ as traces.

The high-temperature gases coming from the reactive zone flow through the part of charge M situated in the angular sector B of the ring and yield a good part of their calories thereto.

The rotation of ring 1 with respect to cage 2 progressively drives the heated elements towards angular zone A where they can yield to the gases flowing in through feed pipe 6 part of the heat energy accumulated.

The layout of the embodiment described above, with the rotating ring 1 provided with a catalyst bed 9, heating means, e.g., resistor R integrated in catalyst bed 9 and means of thermal control through fluid injection, allows the manufacturing and operating costs of the device to be considerably decreased in relation to prior embodiments. The heating means R of the catalyst bed being disconnected prior to starting the device, the rotary connectors that are otherwise required to feed them are thus avoided. The temperature control means (fuel injectors 16, water injector 17 for example) are simply connected to feed pipe 6.

The catalytic reactor consists here of a bed 9 placed in rotary ring 1. Without departing from the scope of the invention, a catalytic reactor placed in a general way in the central zone Zc of the ring, also provided with heating means also working during preheating stages prior to the cleaning operations and disconnected prior to starting the device, can be used.

We claim:

1. A rotary device intended for catalytic cleaning of gaseous effluents loaded with polluting substances, comprising a housing or cage, a ring of vertical axis arranged within the cage and containing a thermal charge of materials exhibiting a heat exchange surface, motive means for driving the ring in a rotating motion with respect to the cage, a catalyst bed reactor provided in a central part of the ring for cleaning effluents, at least one feed pipe for feeding effluents into the cage, at least one discharge pipe for discharging effluents from the cage, the cage comprising at least a first ring sector communicating continuously with the feed pipe and at least a second ring sector communicating continuously with the discharge pipe, heating elements embedded in the catalyst bed reactor for being temporarily connected to a power supply unit external to the device for a time sufficient to bring the catalyst bed reactor to a temperature sufficient to trigger a reaction of catalytic oxidation of the polluting substances, and means for injecting fluids into the effluents fed into the device to control the temperature prevailing in the reactor during effluent cleaning operations.

2. A device as claimed in claim 1, wherein the heating elements of the catalyst bed reactor comprise resistors.

3. A device as claimed in claim 1, wherein catalyst bed reactor is placed in the ring against an inner wall thereof.

4. A device as claimed in claim 1, wherein the fluid injection means comprise an injection circuit for injecting a combustible fluid into the effluents to be cleaned, associated with feed pipe.

5. A device as claimed in claim 1, wherein the fluid injection means comprise an injection circuit for injecting a combustible fluid into the effluents to be cleaned, associated with the feed pipe, and injection means for injecting into the effluents to be cleaned a non-inflammable coolant, the coolant being sprayed water, associated with the feed pipe.

6. A device as claimed in claim 1, wherein the fluid injection means comprise an injection circuit for injecting a flow of temperature control gas into an intermediate zone between the first sector and the second sector.

7. A device as claimed in claim 1, wherein the ring is divided into several angular zones by inner partitions (8).

8. A device as claimed in claim 1, wherein the ring comprises a plurality of parallelepipedic chambers (10) containing the thermal charge.

9. A device as claimed in claim 1, comprising particle filtering means arranged in the ring between the cage and the catalyst bed reactor.

10. A device as claimed in claim 9, wherein the filtering means comprise a filter layer covering the ring externally, made from a metallic, ceramic or composite woven or non-woven material.

11. A device as claimed in claim 1, wherein the ring is off-centre within cage, the cage delimiting around the ring two peripheral zones of variable section, the device further comprising means for preventing parasitic bypass flows to flow round catalyst bed reactor.

12. A device as claimed in claim 1, wherein the ring and the cage comprise each an upper end wall and a lower end wall, and seal elements arranged between the upper and lower walls.

13. A device as claimed in claim 1, comprising injection means for injecting a purge gas stream into an intermediate zone between the first ring sector and the second ring sector.

14. A process intended for continuous cleaning of gaseous effluents loaded with polluting substances by catalytic incineration, comprising providing a device comprising a cage, a ring of vertical axis arranged within the cage and containing at least a thermal charge of materials exhibiting a heat exchange surface, motive means for driving the ring in a rotating motion with respect to the cage, a catalyst bed reactor arranged in the central part of the ring in order to clean the effluents, heating elements embedded in the catalyst bed reactor, at least one feed pipe for feeding effluents into the cage and at least one discharge pipe for discharging effluents from the cage, preheating the catalyst bed reactor by temporarily connecting the heating elements to a power supply unit external to the device until the catalyst bed reactor reaches a temperature sufficient to trigger a reaction of catalytic oxidation of the polluting substances in the gaseous effluents, then disconnecting the heating elements from the power supply unit, then cleaning the gaseous effluents by establishing a permanent circulation of the gaseous effluents to be cleaned through the ring, while rotating the ring with respect to the cage, and thermally controlling an autothermal reaction through controlled injection of a fuel and/or of at least one non-inflammable coolant into the device.

* * * * *